US012680377B2

(12) United States Patent
Jiang

(10) Patent No.: US 12,680,377 B2
(45) Date of Patent: Jul. 14, 2026

(54) DOUBLE-ROW ROPE WINDER FOR CURTAIN AND ELECTRIC CURTAIN

(71) Applicant: NINGBO SUNFREE MOTOR TECHNOLOGY COMPANY LIMITED, Ningbo City (CN)

(72) Inventor: Chun Jiang, Ningbo City (CN)

(73) Assignee: NINGBO SUNFREE MOTOR TECHNOLOGY COMPANY LIMITED, Ningbo City (CN)

( * ) Notice: Subject to any disclaimer, the term of this patent is extended or adjusted under 35 U.S.C. 154(b) by 233 days.

(21) Appl. No.: 18/755,406

(22) Filed: Jun. 26, 2024

(65) Prior Publication Data

US 2025/0020022 A1 Jan. 16, 2025

(30) Foreign Application Priority Data

Jul. 14, 2023 (CN) ........................ 202321860493.7

(51) Int. Cl.
*E06B 9/262* (2006.01)
*E06B 9/322* (2006.01)
*E06B 9/24* (2006.01)
*E06B 9/40* (2006.01)

(52) U.S. Cl.
CPC .............. *E06B 9/322* (2013.01); *E06B 9/262* (2013.01); *E06B 2009/2452* (2013.01); *E06B 2009/2627* (2013.01); *E06B 2009/3222* (2013.01); *E06B 2009/3225* (2013.01); *E06B 9/40* (2013.01)

(58) Field of Classification Search
None
See application file for complete search history.

(56) References Cited

U.S. PATENT DOCUMENTS

| | | | | |
|---|---|---|---|---|
| 8,365,797 B2 * | 2/2013 | Drew | ...................... | E06B 9/262 160/84.05 |
| 8,573,281 B2 * | 11/2013 | Drew | ...................... | E06B 9/262 160/84.05 |
| 9,732,555 B2 * | 8/2017 | Morris | .................... | E06B 9/262 |
| 10,584,530 B2 * | 3/2020 | Hsu | ......................... | E06B 9/323 |
| 10,626,667 B2 * | 4/2020 | Schulman | ............... | E06B 9/322 |
| 10,697,233 B2 * | 6/2020 | Schwandt | ............... | E06B 9/266 |

(Continued)

FOREIGN PATENT DOCUMENTS

CN 115370278 A * 11/2022 ............ E06B 9/322

*Primary Examiner* — Phi D A
(74) *Attorney, Agent, or Firm* — Juan Carlos A. Marquez; Marquez IP Law Office, PLLC

(57) ABSTRACT

A double-row rope winder for a curtain and an electric curtain are provided which comprise a rope winder seat; at least two winding core mounting grooves are juxtaposed on the rope winder seat; a winding core is disposed in the winding core mounting grooves respectively; a first rotary part and a second rotary part are respectively disposed at both ends of the winding cores; a first supporting part and a second supporting part cooperating with the first rotary part and the second rotary part respectively are disposed respectively at both ends of the winding core mounting grooves; a first rope guide hole and a second rope guide hole are symmetrically disposed at both ends inside the winding core mounting grooves; a third rope guide hole and a fourth rope guide hole are symmetrically disposed at both ends between the two adjacent winding core mounting grooves on the rope winder seat.

10 Claims, 9 Drawing Sheets

(56) References Cited

U.S. PATENT DOCUMENTS

| | | | | |
|---|---|---|---|---|
| 10,871,029 | B2 * | 12/2020 | Ter Haar | E06B 9/325 |
| 2008/0216967 | A1 * | 9/2008 | Liang | E06B 9/326<br>160/168.1 V |
| 2014/0014279 | A1 * | 1/2014 | Defenbaugh | E06B 9/68<br>160/168.1 P |
| 2016/0222721 | A1 * | 8/2016 | Rettig | E06B 9/262 |
| 2016/0222723 | A1 * | 8/2016 | Morris | E06B 9/322 |
| 2016/0222725 | A1 * | 8/2016 | Morris | E06B 9/262 |
| 2024/0052699 | A1 * | 2/2024 | Qiu | E06B 9/322 |

* cited by examiner

DOUBLE-ROW ROPE WINDER FOR CURTAIN AND ELECTRIC CURTAIN

This application is based upon and claims priority to Chinese Patent Application No. 202321860493.7, filed on Jul. 14, 2023, the entire contents of which are incorporated herein by reference.

TECHNICAL FIELD

The present disclosure relates to the field of curtain technologies and in particular to a double-row rope winder for a curtain and an electric curtain.

BACKGROUND

For the curtains using a rope winder to take up a pull rope on the current market, most of the curtains use rope winders with single rope winder core with two as one group to adapt to single-face curtains. When they are used for some multi-segment curtains, the same number of rope winders as the segments of the curtains can be disposed. For example, for those back-forth parallel multi-layer curtains and up-down stacked multi-segment curtains and the like, multiple rope winders are to be disposed. This structure features large occupation space, cumbersome assembling and high production costs. On the current market, there are also some combination type rope winders which can be adapted to multi-segment curtains so as to reduce the number of the assembled rope winders. However, such rope winders have the disadvantages of complex structure, inconvenient mounting and complex rope running and thus can be easily assembled in wrong direction. In this case, due to asymmetry of the rope guide holes of the rope winders at both sides, the rope winders have to be remounted, reducing the assembling efficiency and increasing the time and labor.

SUMMARY

For the current situations of the prior arts, the present disclosure provides a double-row rope winder for a curtain and an electric curtain, which feature simple structure, case of rope running, easy assembling and bidirectional mounting, eliminating the problem of re-mounting due to incorrect mounting and improving the assembling efficiency.

In order to solve the above technical problems, the present disclosure employs the following technical solution: there is provided a double-row rope winder for a curtain, which comprises a rope winder seat. At least two winding core mounting grooves are juxtaposed on the rope winder seat. A winding core for winding or unwinding a winding rope is disposed in the winding core mounting grooves respectively. A first rotary part and a second rotary part are respectively disposed at both ends of the winding cores. A first supporting part and a second supporting part cooperating with the first rotary part and the second rotary part respectively are disposed respectively at both ends of the winding core mounting grooves. A first rope guide hole and a second rope guide hole are symmetrically disposed at both ends inside the winding core mounting grooves. A third rope guide hole and a fourth rope guide hole are symmetrically disposed at both ends between the two adjacent winding core mounting grooves on the rope winder seat.

Furthermore, the rope winder seat is a symmetrical structure, which is symmetrical left and right along a length centerline of the rope winder seat and also symmetrical up and down along a width centerline of the rope winder seat.

Furthermore, two winding core mounting grooves are juxtaposed on the rope winder seat, where the two winding core mounting grooves are a first winding core mounting groove and a second winding core mounting groove respectively. Two ends of the first winding core mounting groove and two ends of the second winding core mounting groove are respectively aligned and are in a same horizontal line.

Furthermore, the first winding core mounting groove is in communication with the second winding core mounting groove. The third rope guide hole is located between the first rope guide holes in the first winding core mounting groove and the second winding core mounting groove, and the fourth rope guide hole is located between the second rope guide holes in the first winding core mounting groove and the second winding core mounting groove.

Furthermore, the third rope guide hole is in the same horizontal line as the two adjacent first rope guide holes and located in a middle point between the two adjacent first rope guide holes. The fourth rope guide hole is in the same horizontal line as the two adjacent second rope guide holes and located in a middle point between the two adjacent second rope guide holes. An anti-wear guide sleeve is disposed in the first rope guide holes, the second rope guide holes, the third rope guide hole and the fourth rope guide hole respectively.

Furthermore, a shaft hole is disposed in the first rotary part and the second rotary part respectively. The first rotary part is a blade-turning wheel and a shaft column is disposed at an end of the blade-turning wheel away from the winding core. The shaft column is in rotary cooperation with the first supporting part through a bearing. The second rotary part is a rolling shaft which is in rotary cooperation with the second supporting part through a bearing.

Furthermore, a cover plate for covering the winding cores is disposed on the winding core mounting grooves. One end of the cover plate is fitted to the first supporting part and the other end of the cover plate is fitted to the second supporting part. A plurality of through holes arranged with equal distance along a length direction of the cover plate are disposed on the cover plate.

There is provided an electric curtain, which comprises a curtain body, a top beam, a drive device, a transmission assembly and the double-row rope winder for the curtain mentioned above. The drive device is mounted at an end of the top beam. The drive device drives the double-row rope winder through the transmission assembly to control the curtain body to open and close. The double-row rope winders are symmetrically disposed inside the top beam. An end cover is connected at an end of the top beam opposed to the drive device. The curtain body comprises a daytime-use curtain body and a nighttime-use curtain body. A lower end of the daytime-use curtain body is connected with a first track, and a lower end of the nighttime-use curtain body is connected with a second track.

Furthermore, the daytime-use curtain body and the nighttime-use curtain body are disposed in parallel back and forth below the top beam. The drive device comprises a first output end and a second output end disposed abreast. The transmission assembly comprises a first transmission shaft and a second transmission shaft. The first output end of the drive device is connected with the first transmission shaft which penetrates through the winding cores inside the first winding core mounting grooves in two double-row rope winders. A first winding rope is wound on the winding cores inside the first winding core mounting grooves respectively. The first winding rope in one double-row rope winder runs through the first rope guide hole or the second rope guide hole in the first winding core mounting groove and the daytime-use curtain body to connect with the first track; the first winding rope in the other double-row rope winder runs through the second rope guide hole or the first rope guide hole in the first winding core mounting groove and the daytime-use curtain body to connect with the first track. The first transmission shaft rotates to simultaneously drive the rotation of the winding cores in the two first winding core mounting grooves so as to control the two first winding ropes to wind or unwind and hence control the daytime-use curtain body to close or open. The second output end of the drive device is connected with the second transmission shaft which penetrates through the winding cores inside the second winding core mounting grooves in two double-row rope winders. A second winding rope is wound on the winding cores inside the second winding core mounting grooves respectively. The second winding rope in one double-row rope winder runs through the first rope guide hole or the second rope guide hole in the second winding core mounting groove and the nighttime-use curtain body to connect with the second track; the second winding rope in the other double-row rope winder runs through the second rope guide hole or the first rope guide hole in the second winding core mounting groove and the nighttime-use curtain body to connect with the second track. The second transmission shaft rotates to simultaneously drive the rotation of the winding cores in the two second winding core mounting grooves so as to control the two second winding ropes to wind or unwind and hence control the nighttime-use curtain body to close or open.

Furthermore, the daytime-use curtain body and the nighttime-use curtain body are disposed up and down below the top beam. The drive device comprises a first output end and a second output end disposed abreast. The transmission assembly comprises a first transmission shaft and a second transmission shaft. The first output end of the drive device is connected with the first transmission shaft which penetrates through the winding cores inside the first winding core mounting grooves in two double-row rope winders. A first winding rope is wound on the winding cores inside the first winding core mounting grooves respectively. The first winding rope in one double-row rope winder runs through the third rope guide hole or the fourth rope guide hole, the daytime-use curtain body, the first track, and the nighttime-use curtain body to connect with the second track; the first winding rope in the other double-row rope winder runs through the fourth rope guide hole or the third rope guide hole, the daytime-use curtain body, the first track, and the nighttime-use curtain body to connect with the second track. The first transmission shaft rotates to simultaneously drive the rotation of the winding cores in the two first winding core mounting grooves so as to control the two first winding ropes to wind or unwind and hence control the nighttime-use curtain body to close or open. The second output end of the drive device is connected with the second transmission shaft which penetrates through the winding cores inside the second winding core mounting grooves in two double-row rope winders. A second winding rope is wound on the winding cores inside the second winding core mounting grooves respectively. The second winding rope in one double-row rope winder runs through the fourth rope guide hole or the third rope guide hole and the daytime-use curtain body to connect with the first track; the second winding rope in the other double-row rope winder runs through the third rope guide hole or the fourth rope guide hole and the daytime-use curtain body to connect with the first track. The second transmission shaft rotates to simultaneously drive the rotation of the winding cores in the two second winding core mounting grooves so as to control the two second winding ropes to wind or unwind and hence control the daytime-use curtain body to close or open.

Compared with the prior arts, the present disclosure has the following advantages: the present disclosure is simple in structure and the rope guide holes are symmetrically disposed, for example, the first rope guide holes and the second rope guide holes are symmetrically disposed, and the third rope guide hole and the fourth rope guide hole are symmetrically disposed. When the winding rope is connected through, the advantages of both-side symmetry, balanced stress and even winding and unwinding can be realized and the assembling problems can be reduced. Furthermore, the double-row rope winder is a symmetrical structure which can be mounted to the top beam of the curtain in forward or reverse direction, eliminating the problem of re-mounting due to incorrect mounting and improving the assembling efficiency. In addition, the curtain using the double-row rope winder of the present disclosure can be assembled into a single-row curtain or a double-row curtain, bringing broad application scope, convenience of assembling and ease of correct mounting.

BRIEF DESCRIPTION OF THE DRAWINGS

In order to describe the technical solutions in the embodiments of the present disclosure or in the prior art more clearly, brief descriptions will be made below to the accompanying drawings involved in descriptions of the embodiments or the prior art. Obviously, the accompanying drawings are merely illustrative, and other drawings may also be obtained by those skilled in the art based on these drawings without carrying out creative work.

The structures, scales, sizes and the like depicted in the specification are only used by those skilled in the art to know and read the contents disclosed by the specification rather than to limit the embodiments of the present disclosure. Therefore, the structures, scales, sizes and the like do not have technically substantive meanings. Any modification, changes or adjustment to the structures, the scales and sizes shall all fall within the scope of protection covered by the technical contents disclosed by the present disclosure without affecting the effects and the purposes achieved by the present disclosure.

Figure 1:
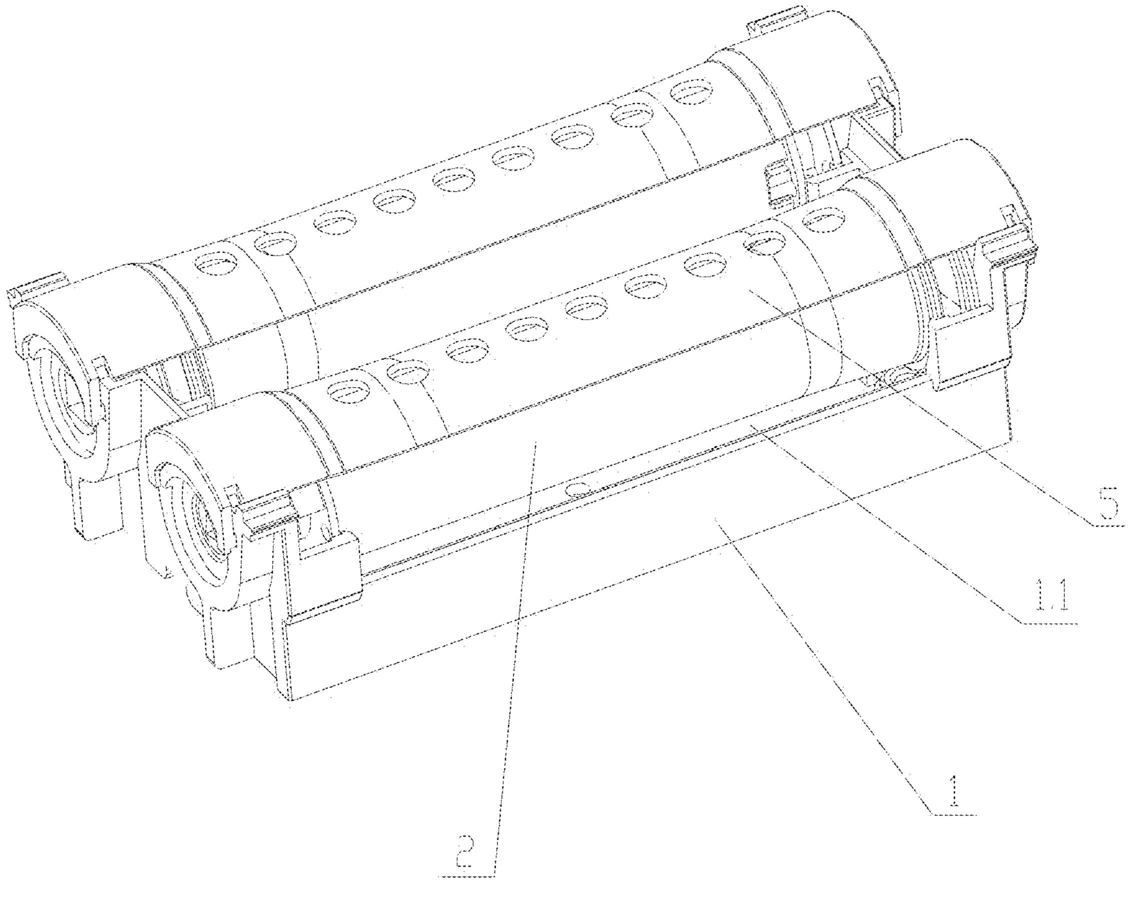
FIG. 1 is a structural schematic diagram of the present disclosure.

Numerals of the drawings are described below: 1. rope winder seat, 1.1. winding core mounting groove, 1.1*a*. first winding core mounting groove, 1.1*b*. second winding core mounting groove, 1.2 first supporting part, 1.3 second supporting part, 1.4 first rope guide hole, 1.5 second rope guide hole, 1.6 third rope guide hole, 1.7 fourth rope guide hole, 2. winding core, 2.1 first rotary part, 2.1.1 shaft column, 2.2 second rotary part, 2.3 shaft hole, 3. guide sleeve, 4. bearing, 5. cover plate, 5.1 through hole, 6. top beam, 7. drive device, 7.1 first output end, 7.2 second output end, 8. transmission assembly, 8.1 first transmission shaft, 8.2 second transmission shaft, 9. end cover, 10. daytime-use curtain body, 11. nighttime-use curtain body, 12. first track, 13. second track, 14. first winding rope, and 15. second winding rope.

DETAILED DESCRIPTIONS OF EMBODIMENTS

The present disclosure will be further described below with specific embodiments.

In the descriptions of the present disclosure, it is understood that orientation or positional relationship indicated by the terms such as "central", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", and "circumferential" is used only for ease of descriptions and simplification of descriptions and does not indicate or imply that the indicated devices or elements must have a particular orientation, or be constructed or operated in a particular orientation. Therefore, such terms shall not be understood as limiting of the present disclosure.

Further, the terms "first" and "second" are used for descriptions only and shall not be understood as indicating or implying relative importance or implicitly indicating the number of the indicated technical features. As a result, the features defined by the "first" and "second" may explicitly or implicitly include at least one feature. In the descriptions of the present disclosure, "plural" means at least two, for example, two or three or the like, unless otherwise clearly stated.

In the present disclosure, unless otherwise clearly stated or defined, the terms "mount", "connect", "couple", and "fix" and the like shall be understood in a broad sense, for example, may be fixed connection, or detachable connection, or formed into one piece; or may be mechanical connection, or electrical connection; or direct connection or indirect connection through an intermediate medium, or may be internal communication between two elements or mutual interaction of two elements, unless otherwise stated. Those skilled in the art may understand the specific meanings of the above terms in the present disclosure according to actual situations.

In the present disclosure, unless otherwise clearly stated or defined, the first feature being "on" or "below" the second feature refers to that the first feature and the second feature are in direct contact, or the first feature and the second feature are in indirect contact through an intermediate medium. Furthermore, the first feature being "above" or "on" the second feature refers to that the first feature is exactly above or obliquely above the second feature, or only refers to that the first feature has a higher horizontal height than the second feature. The first feature being "under" or "below" the second feature refers to that the first feature is exactly under or obliquely below the second feature, or only refers to that the first feature has a smaller horizontal height than the second feature.

Figure 2:
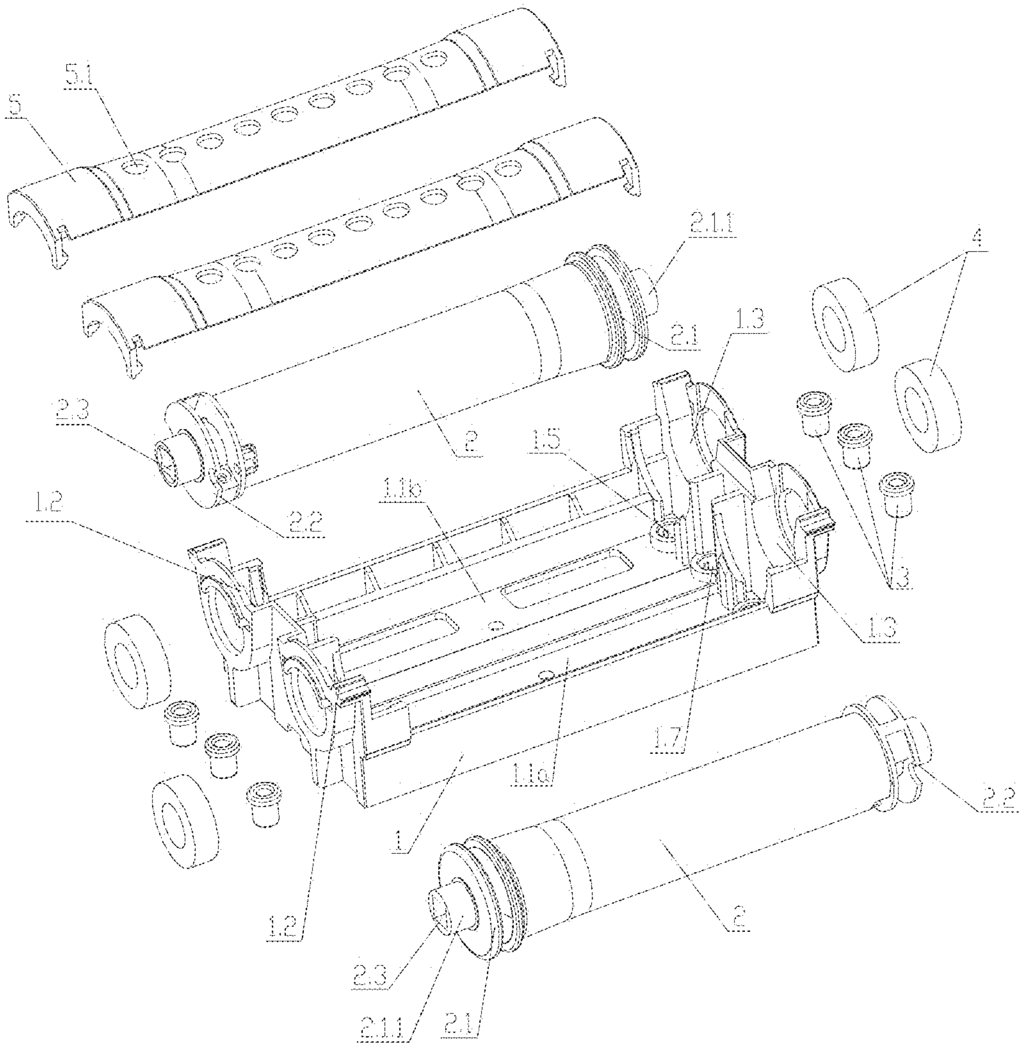
FIG. 2 is an exploded schematic diagram of the present disclosure.
Figure 3:
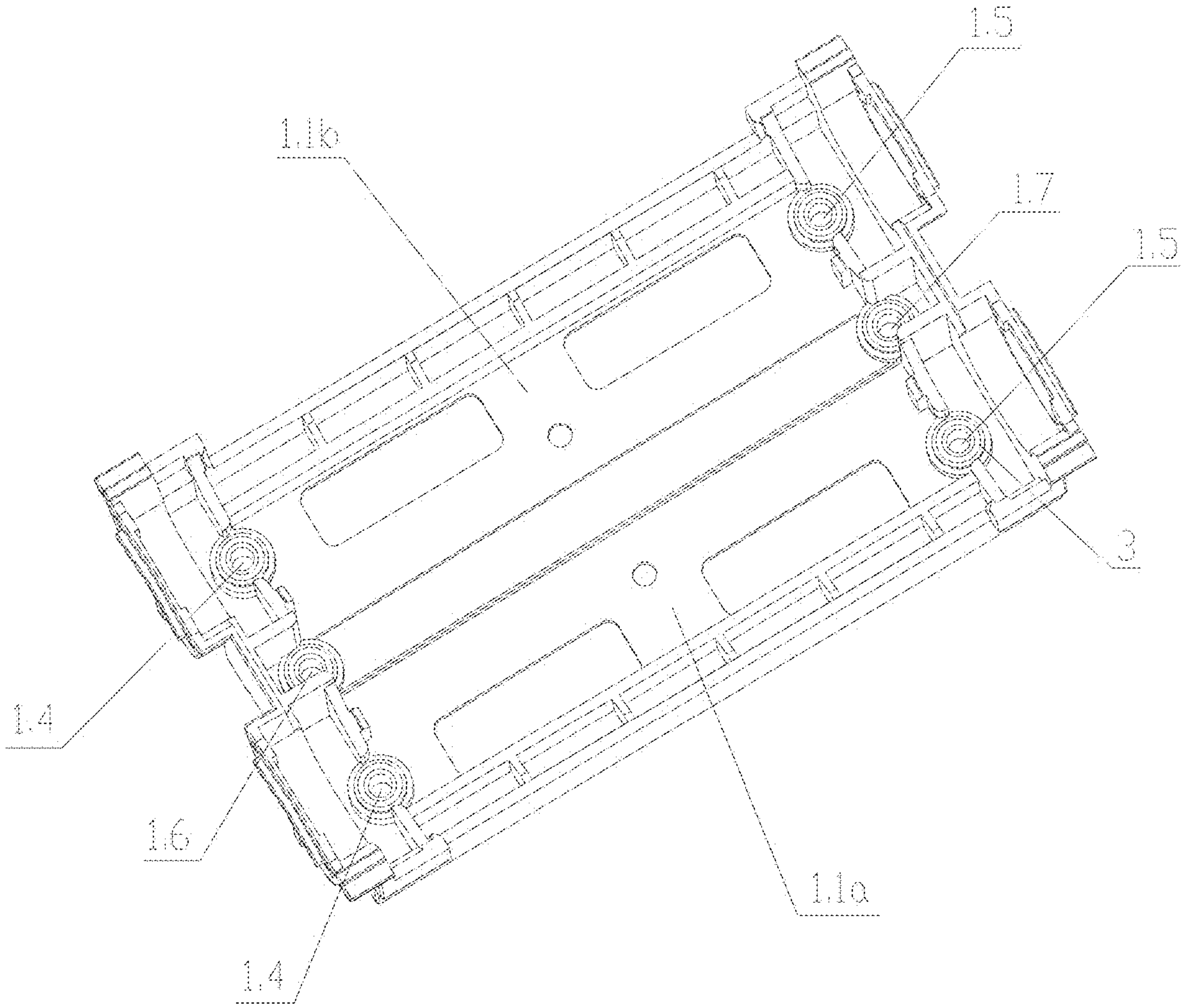
FIG. 3 is a structural schematic diagram of a rope winder seat according to the present disclosure.

As shown in FIGS. 1 to 3, the present disclosure provides a double-row rope winder for a curtain, which comprises a rope winder seat 1. At least two winding core mounting grooves 1.1 are juxtaposed on the rope winder seat 1. A winding core 2 for winding or unwinding a winding rope is disposed in the winding core mounting grooves 1.1 respectively. A first rotary part 2.1 and a second rotary part 2.2 are respectively disposed at both ends of the winding cores 2. A first supporting part 1.2 and a second supporting part 1.3 cooperating with the first rotary part 2.1 and the second rotary part 2.2 respectively are disposed respectively at both ends of the winding core mounting grooves 1.1. The first supporting part 1.2 and the second supporting part 1.3 are structurally same and symmetrical. A first rope guide hole 1.4 and a second rope guide hole 1.5 are symmetrically disposed at both ends inside the winding core mounting grooves 1.1. A third rope guide hole 1.6 and a fourth rope guide hole 1.7 are symmetrically disposed at both ends between the two adjacent winding core mounting grooves 1.1 on the rope winder seat 1. The rope winder seat 1 is a symmetrical structure, which is symmetrical left and right along a length centerline of the rope winder seat 1 and also symmetrical up and down along a width centerline of the rope winder seat 1, that is, the rope winder seat 1 is mounted with rotation of 180 degrees is like being mounted without rotation of 180 degrees. Therefore, the rope winder seat 1 can be mounted along forward or reverse direction, eliminating the problem of re-mounting due to mounting in a wrong direction. Neither of the mountings in the forward and reverse directions affects the symmetrical relationship of the rope guide holes. In this way, symmetrical rope-running, balanced stress, simple structure and convenient assembly all can be achieved.

Preferably, two winding core mounting grooves 1.1 are juxtaposed on the rope winder seat 1, where the two winding core mounting grooves 1.1 are a first winding core mounting groove 1.1*a* and a second winding core mounting groove 1.1*b* respectively. Two ends of the first winding core mounting groove 1.1*a* and two ends of the second winding core mounting groove 1.1*b* are respectively aligned and are in a same horizontal line, that is, the first winding core mounting groove 1.1*a* and the second winding core mounting groove 1.1*b* are disposed in parallel with heads and tails respectively aligned, so as to realize a symmetrical structure. The first winding core mounting groove 1.1*a* is in communication with the second winding core mounting groove 1.1*b* to facilitate rope-running. The third rope guide hole 1.6 is located between the first rope guide holes 1.4 in the first winding core mounting groove 1.1*a* and the second winding core mounting groove 1.1*b*, and the fourth rope guide hole 1.7 is located between the second rope guide holes 1.5 in the first winding core mounting groove 1.1*a* and the second winding core mounting groove 1.1*b*. The third rope guide hole 1.6 is in the same horizontal line as the two adjacent first rope guide holes 1.4 and located in a middle point between the two adjacent first rope guide holes 1.4. The fourth rope guide hole 1.7 is in the same horizontal line as the two adjacent second rope guide holes 1.5 and located in a middle point between the two adjacent second rope guide holes 1.5. This structure has the advantages of good symmetry, balanced stress, and convenient rope running. An anti-wear guide sleeve 3 is disposed in the first rope guide holes 1.4, the second rope guide holes 1.5, the third rope guide hole 1.6 and the fourth rope guide hole 1.7 respectively. The disposal of the guide sleeves 3 can not only reduce the wear of the winding rope and extend the service life of the winding rope, but also reduce the wear of the rope guide holes and prevent the winding rope from cutting the rope guide holes.

A shaft hole 2.3 for inserting a transmission shaft is disposed in the first rotary part 2.1 and the second rotary part 2.2 respectively. The winding cores 2 are of hollow structure and can be provided for the transmission shaft to run through, and thus can be rotated along with the rotation of the transmission shaft. The first rotary part 2.1 is a blade-turning wheel and a shaft column 2.1.1 is disposed at an end of the blade-turning wheel away from the winding core 2. The shaft column 2.1.1 is in rotary cooperation with the first supporting part 1.2 through a bearing 4. The second rotary part 2.2 is a rolling shaft which is in rotary cooperation with the second supporting part 1.3 through a bearing 4. The blade-turning wheel may also be connected with a reversing rope, for example, so as to adapt to a Venetian blind. The direction of the blades of the Venetian blind can be adjusted by rotation of the blade-turning wheel to realize light adjustment. The blade-turning wheel has an outer diameter reduced from both ends to middle to facilitate connection with the reversing rope and reduce the possibility of slip during a blade-turning process.

A cover plate 5 for covering the winding cores 2 is disposed on the winding core mounting grooves 1.1. One end of the cover plate 5 is fitted to the first supporting part 1.2 and the other end of the cover plate 5 is fitted to the second supporting part 1.3. A plurality of through holes 5.1 arranged with equal distance along a length direction of the cover plate 5 are disposed on the cover plate 5. The cover plate 5 is disposed to tightly press the winding rope wound on the winding core 2 to prevent uneven winding of the winding rope, and the disposal of the through holes 5.1 further helps even winding of the winding rope. In this way, the winding rope can be orderly wound on the winding cores and also the winding rope can be wound or unwound more smoothly with less effort.

In the double-row rope winder provided by the present disclosure, the structure is simple and the rope guide holes are symmetrically disposed, for example, the first rope guide holes 1.4 and the second rope guide holes 1.5 are symmetrically disposed, and the third rope guide hole 1.6 and the fourth rope guide hole 1.7 are symmetrically disposed. The double-row rope winder is used with two winders as one group, and when the winding rope is connected through, the advantages of both-side symmetry, balanced stress and even winding and unwinding can be realized and the assembling problems can be reduced. Furthermore, the double-row rope winder is a symmetrical structure which can be mounted to a top beam of a curtain in forward or reverse direction, eliminating the problem of re-mounting due to incorrect mounting and improving the assembling efficiency.

The present disclosure further provides an electric curtain, which comprises a curtain body, a top beam 6, a drive device 7, a transmission assembly 8 and the double-row rope winder for the curtain mentioned above. The drive device 7 is mounted at an end of the top beam 6 and covers the end of the top beam 6. The drive device 7 drives the double-row rope winder through the transmission assembly 8 to control the curtain body to open and close. The double-row rope winders are symmetrically disposed inside the top beam 6. An end cover 9 is connected at an end of the top beam 6 opposed to the drive device 7. The curtain body comprises a daytime-use curtain body 10 and a nighttime-use curtain body 11. A lower end of the daytime-use curtain body 10 is connected with a first track 12, and a lower end of the nighttime-use curtain body 11 is connected with a second track 13. The drive device 7 may be two separate single-output motor structures or a structure of double motor and double outputs.

Figure 4:
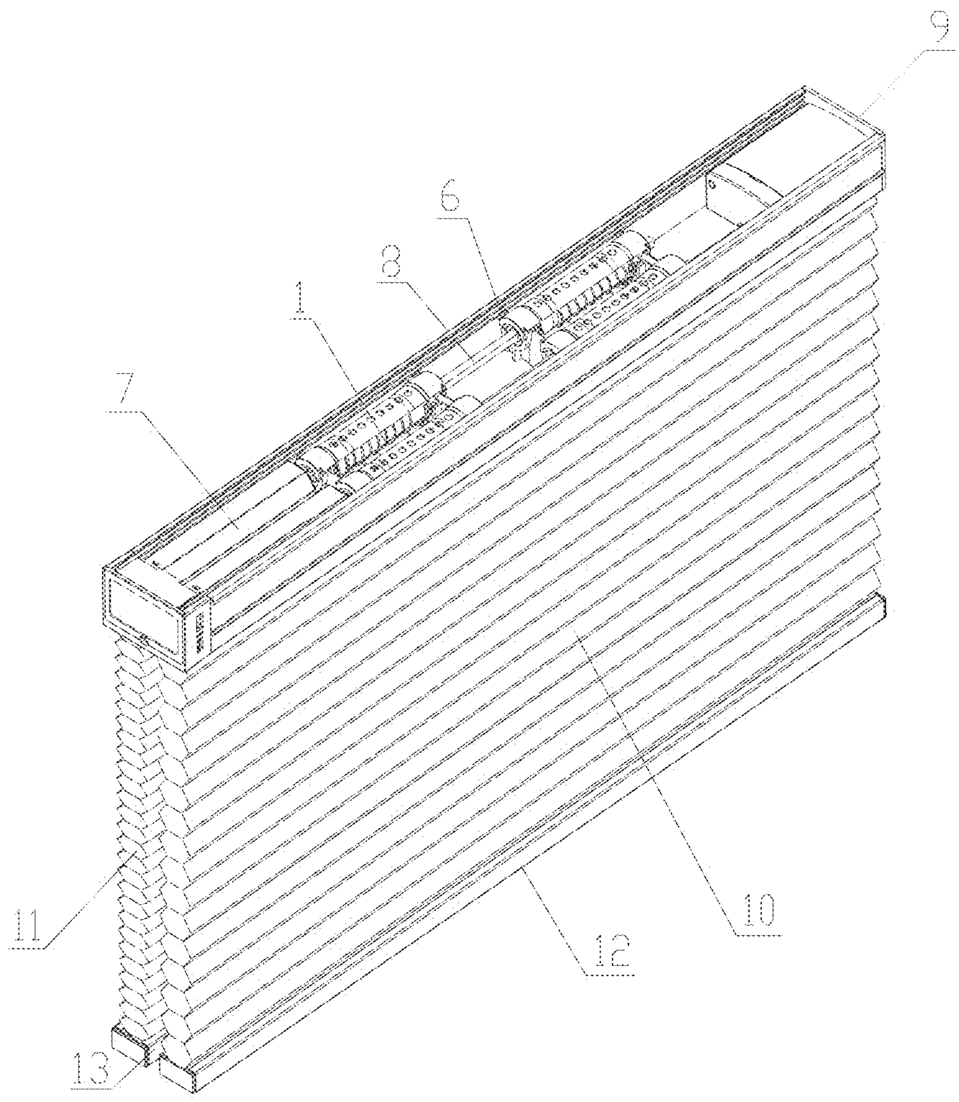
FIG. 4 is a structural schematic diagram of an electric curtain according to an embodiment of the present disclosure.
Figure 5:
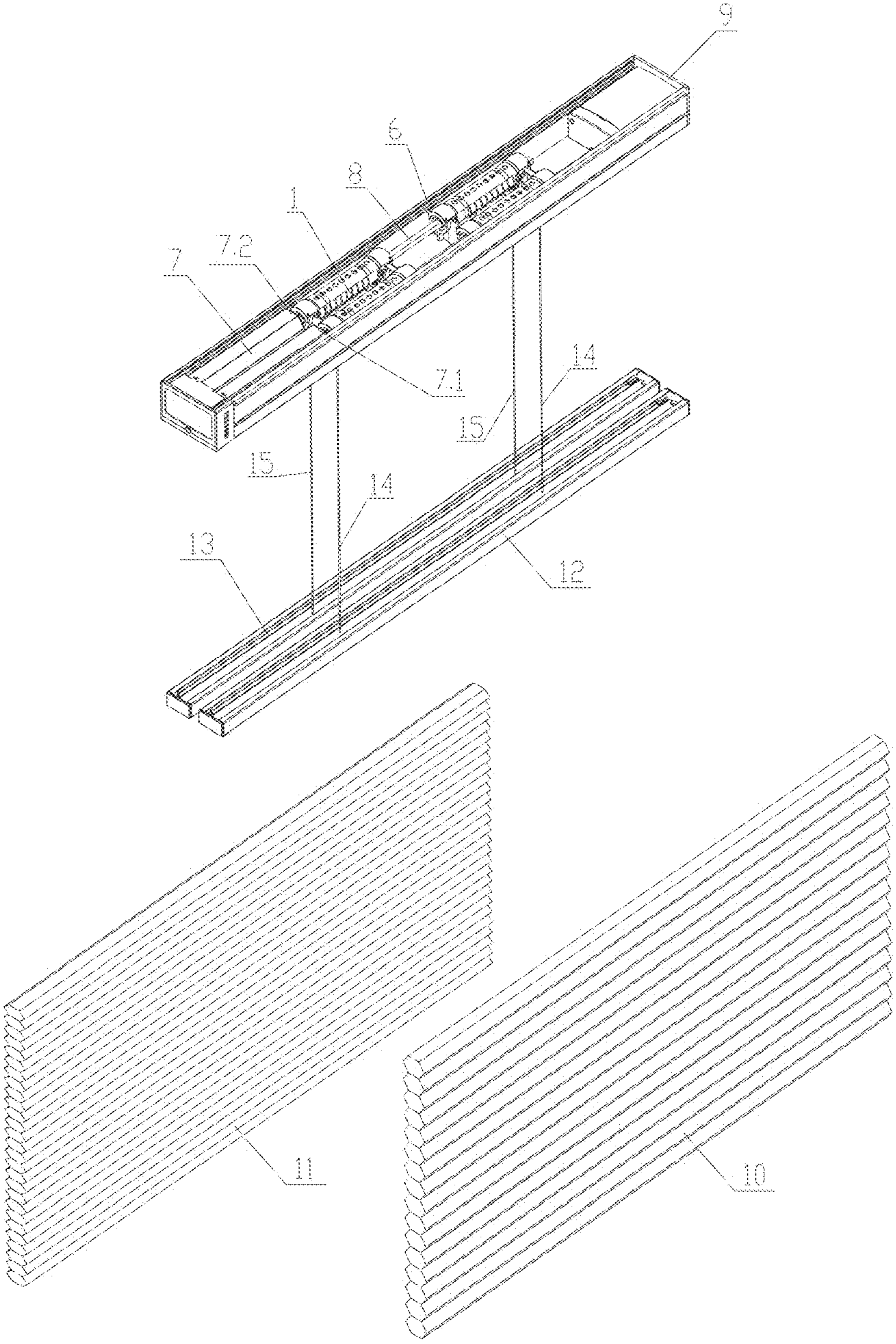
FIG. 5 is an exploded schematic diagram of an electric curtain according to an embodiment of the present disclosure.
Figure 6:
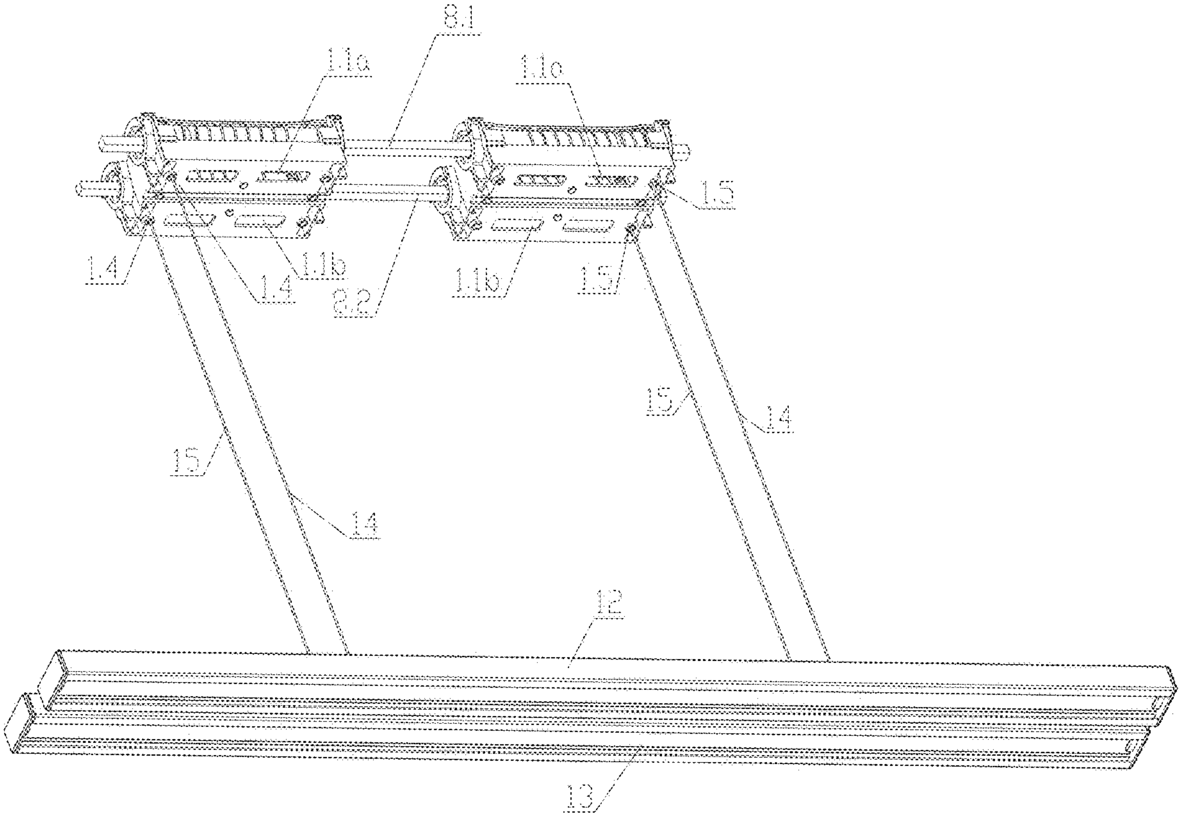
FIG. 6 is a schematic diagram of running a rope for an electric curtain according to an embodiment of the present disclosure.

As a preferred embodiment, as shown in FIGS. 4 to 6, the daytime-use curtain body 10 and the nighttime-use curtain body 11 are disposed in parallel back and forth below the top beam 6. The drive device 7 comprises a first output end 7.1 and a second output end 7.2 disposed abreast. The transmission assembly 8 comprises a first transmission shaft 8.1 and a second transmission shaft 8.2. The first output end 7.1 of the drive device 7 is connected with the first transmission shaft 8.1 which penetrates through the winding cores 2 inside the first winding core mounting grooves 1.1*a* in two double-row rope winders. A first winding rope 14 is wound on the winding cores 2 inside the first winding core mounting grooves 1.1*a* respectively. The first winding rope 14 in one double-row rope winder runs through the first rope guide hole 1.4 or the second rope guide hole 1.5 in the first winding core mounting groove 1.1*a* and the daytime-use curtain body 10 to connect with the first track 12; the first winding rope 14 in the other double-row rope winder runs through the second rope guide hole 1.5 or the first rope guide hole 1.4 in the first winding core mounting groove 1.1*a* and the daytime-use curtain body 10 to connect with the first track 12. It should be noted that when the first winding rope 14 in one double-row rope winder runs through the first rope guide hole 1.4 in the first winding core mounting groove 1.1*a* in the one double-row rope winder, the first winding rope 14 in the other double-row rope winder runs through the second rope guide hole 1.5 in the first winding core mounting groove 1.1*a* in the other double-row rope winder, which ensures balanced stress at both sides. The first transmission shaft 8.1 rotates to simultaneously drive the rotation of the winding cores 2 in the two first winding core mounting grooves 1.1*a* so as to control the two first winding ropes 14 to wind or unwind and hence control the daytime-use curtain body 10 to close or open. The second output end 7.2 of the drive device 7 is connected with the second transmission shaft 8.2 which penetrates through the winding cores 2 inside the second winding core mounting grooves 1.1*b* in two double-row rope winders. A second winding rope 15 is wound on the winding cores 2 inside the second winding core mounting grooves 1.1*b* respectively. The second winding rope 15 in one double-row rope winder runs through the first rope guide hole 1.4 or the second rope guide hole 1.5 in the second winding core mounting groove 1.1*b* and the nighttime-use curtain body 11 to connect with the second track 13; the second winding rope 15 in the other double-row rope winder runs through the second rope guide hole 1.5 or the first rope guide hole 1.4 in the second winding core mounting groove 1.1*b* and the nighttime-use curtain body 11 to connect with the second track 13. The second transmission shaft 8.2 rotates to simultaneously drive the rotation of the winding cores 2 in the two second winding core mounting grooves 1.1*b* so as to control the two second winding ropes 15 to wind or unwind and hence control the nighttime-use curtain body 11 to close or open.

Figure 7:
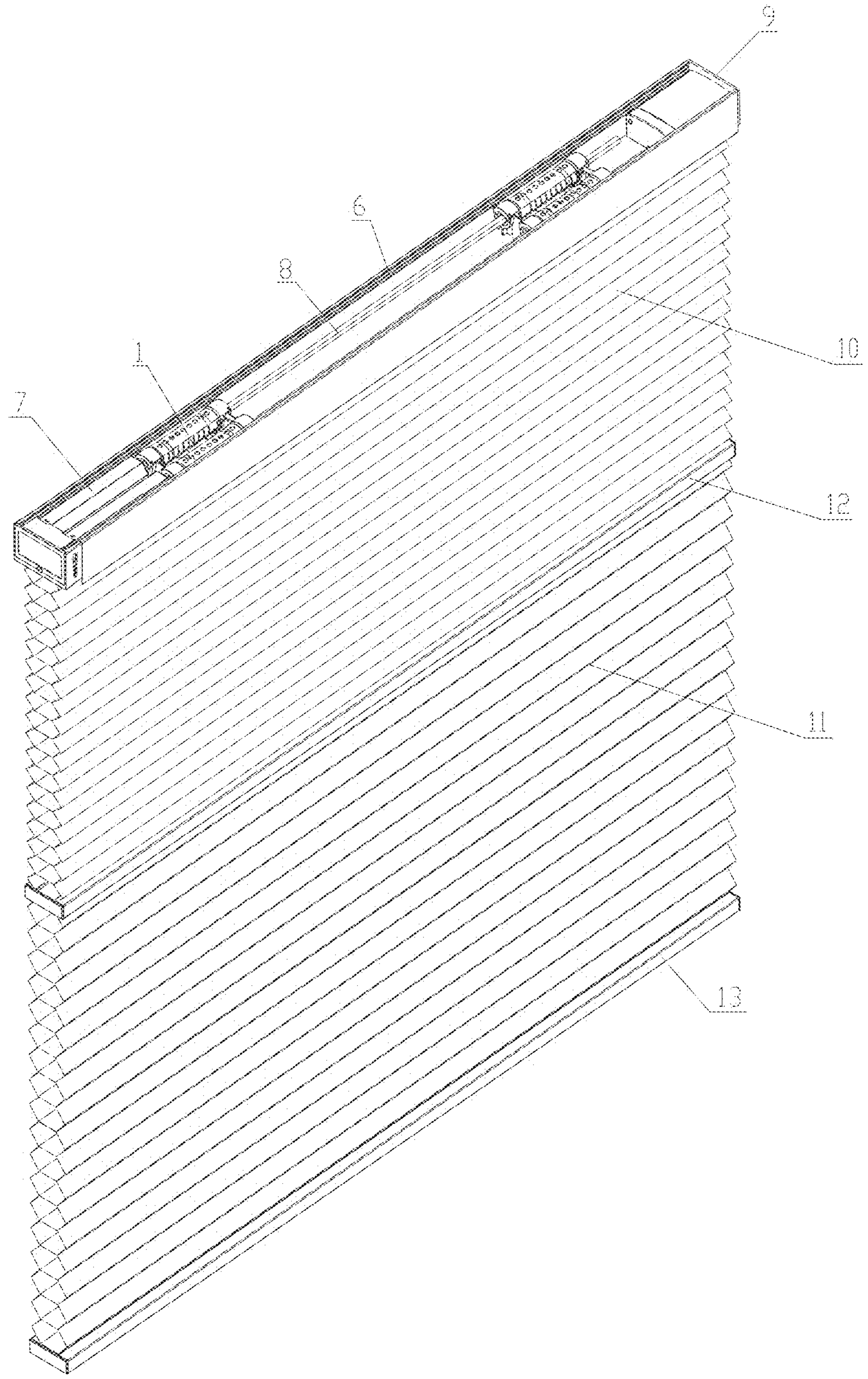
FIG. 7 is a structural schematic diagram of an electric curtain according to another embodiment of the present disclosure.
Figure 8:
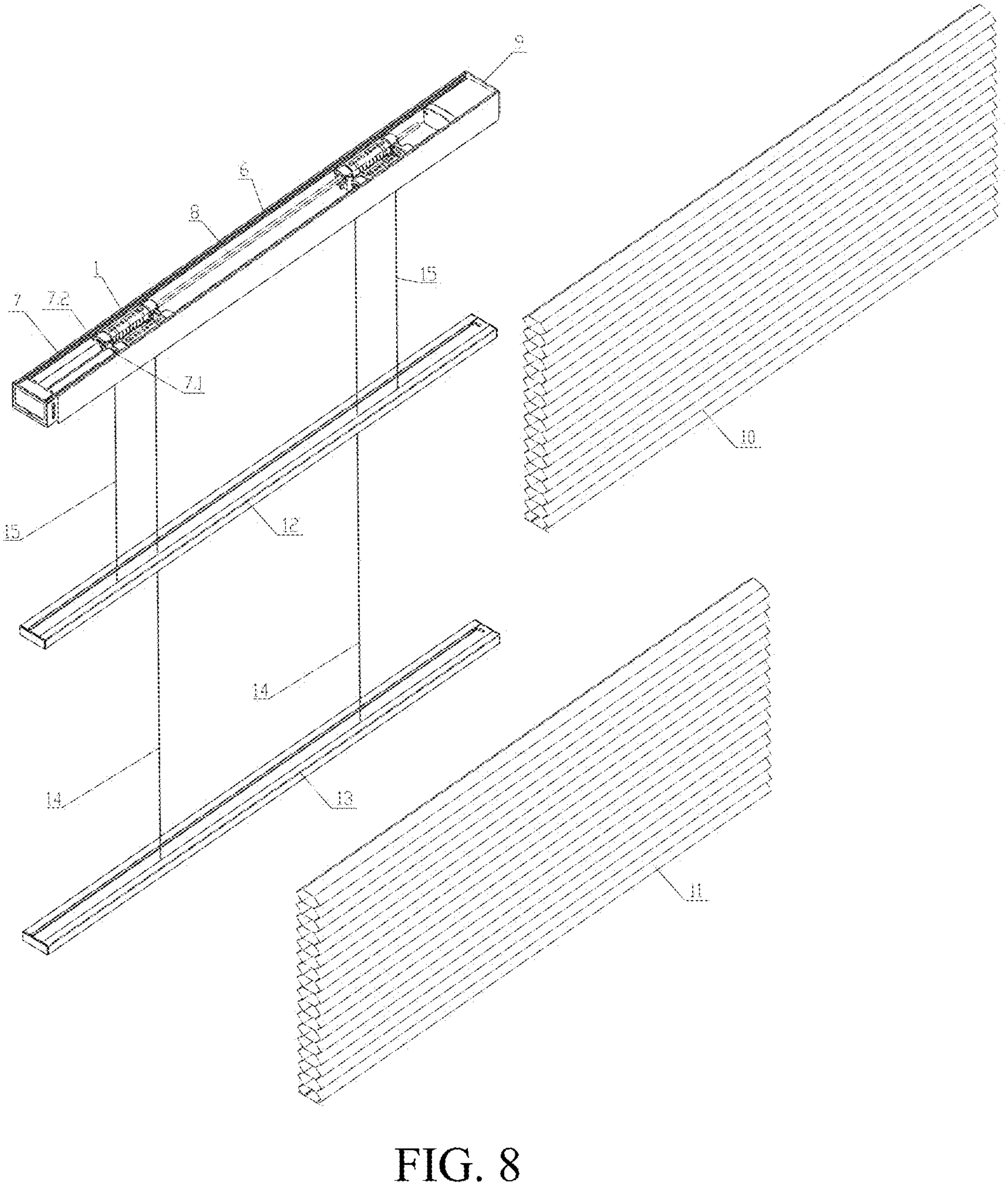
FIG. 8 is an exploded schematic diagram of an electric curtain according to another embodiment of the present disclosure.
Figure 9:
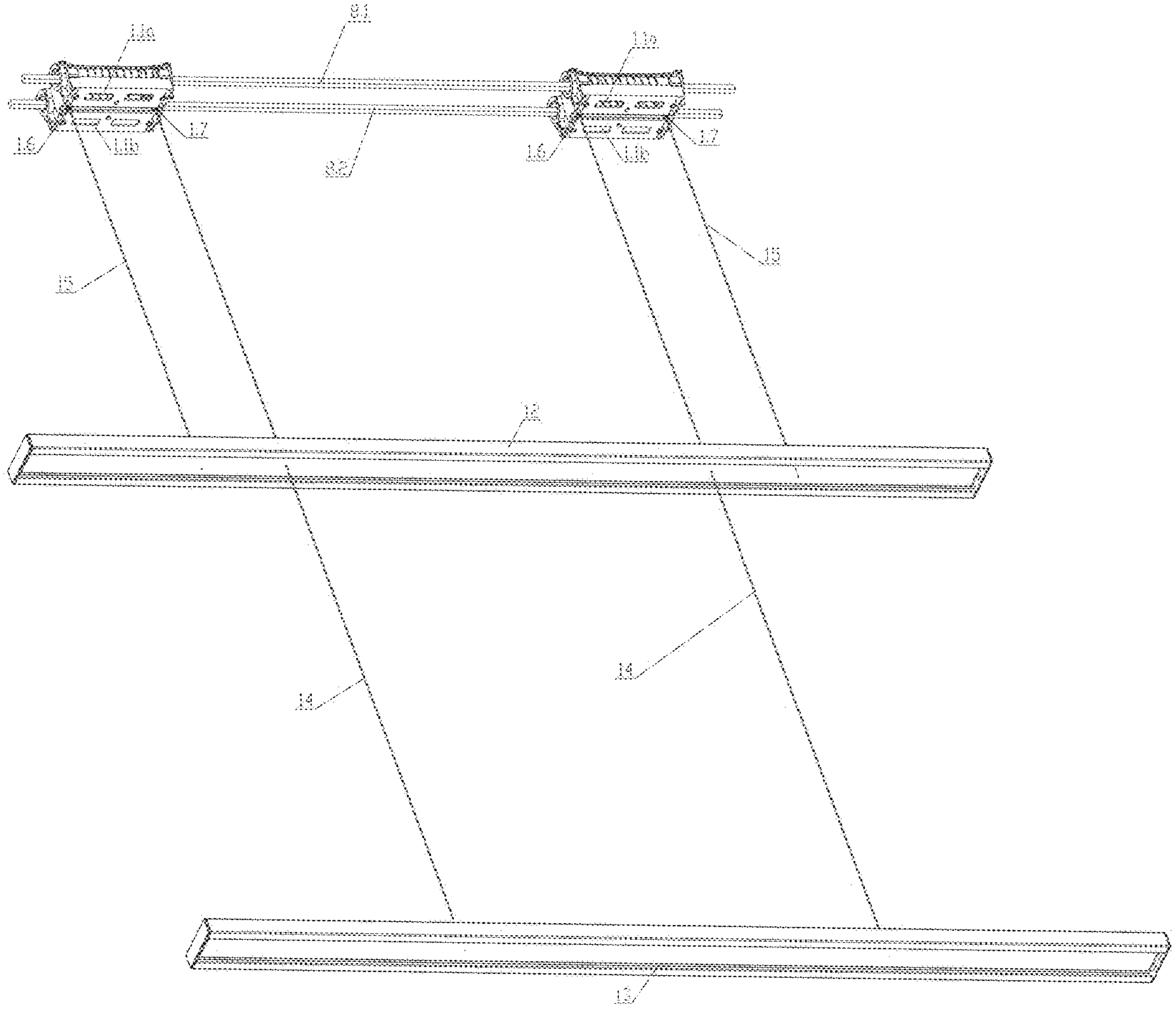
FIG. 9 is a schematic diagram of running a rope for an electric curtain according to another embodiment of the present disclosure.

As another preferred embodiment, as shown in FIGS. 7 to 9, the daytime-use curtain body 10 and the nighttime-use curtain body 11 are disposed up and down below the top beam 6. The drive device 7 comprises a first output end 7.1 and a second output end 7.2 disposed abreast. The transmission assembly 8 comprises a first transmission shaft 8.1 and a second transmission shaft 8.2. The first output end 7.1 of the drive device 7 is connected with the first transmission shaft 8.1 which penetrates through the winding cores 2 inside the first winding core mounting grooves 1.1*a* in two double-row rope winders. A first winding rope 14 is wound on the winding cores 2 inside the first winding core mounting grooves 1.1*a* respectively. The first winding rope 14 in one double-row rope winder runs through the third rope guide hole 1.6 or the fourth rope guide hole 1.7, the daytime-use curtain body 10, the first track 12, and the nighttime-use curtain body 11 to connect with the second track 13; the first winding rope 14 in the other double-row rope winder runs through the fourth rope guide hole 1.7 or the third rope guide hole 1.6, the daytime-use curtain body 10, the first track 12, and the nighttime-use curtain body 11 to connect with the second track 13. The first transmission shaft 8.1 rotates to simultaneously drive the rotation of the winding cores 2 in the two first winding core mounting grooves 1.1*a* so as to control the two first winding ropes 14 to wind or unwind and hence control the nighttime-use curtain body 11 to close or open. The second output end 7.2 of the drive device 7 is connected with the second transmission shaft 8.2 which penetrates through the winding cores 2 inside the second winding core mounting grooves 1.1*b* in two double-row rope winders. A second winding rope 15 is wound on the winding cores 2 inside the second winding core mounting grooves 1.1*b* respectively. The second winding rope 15 in one double-row rope winder runs through the fourth rope guide hole 1.7 or the third rope guide hole 1.6 and the daytime-use curtain body 10 to connect with the first track 12; the second winding rope 15 in the other double-row rope winder runs through the third rope guide hole 1.6 or the fourth rope guide hole 1.7 and the daytime-use curtain body 10 to connect with the first track 12. The second transmission shaft 8.2 rotates to simultaneously drive the rotation of the winding cores 2 in the two second winding core mounting grooves 1.1*b* so as to control the two second winding ropes 15 to wind or unwind and hence control the daytime-use curtain body 10 to close or open. It should be noted that when the first winding rope 14 in one double-row rope winder runs through the fourth rope guide hole 1.7, the first winding rope 14 in the other double-row rope winder runs through the third rope guide hole 1.6, and the second winding rope 15 in one double-row rope winder runs through the third rope guide hole 1.6, and the second winding rope 15 in the other double-row rope winder runs through the fourth rope guide hole 1.7. In this way, balanced stress of both sides can be achieved.

In the electric curtain provided by the present disclosure, the double-row rope winder can be easily assembled, eliminating the problem of re-mounting due to mounting in a wrong direction. The double-row rope winder is symmetrical and can be quickly assembled into the top beam in forward or reverse direction. In this case, the first winding rope 14 and the second winding rope 15 can be quickly and easily run, achieving symmetrical rope-running and balanced stress, and improving the assembling efficiency. In addition, double-row curtains, for example, a curtain of up-down structure or back-forth parallel structure, can be assembled, and further, single-row curtains can be also assembled, resulting in broad application scope. Moreover, it is noted that, in the double-row curtain of the up-down structure and the back-forth parallel structure as mentioned above, the daytime-use curtain body 10 and the nighttime-use curtain body 11 are not mounted only at one position, but can be exchanged back and forth or up and down.

The materials, reagents and experimental instruments involved in the embodiments of the present disclosure are all commercially-available products in the curtain field, unless otherwise stated.

Finally, it is to be pointed out that the above embodiments are merely used to describe the technical solution of the present disclosure rather than limit the present disclosure. Although detailed descriptions are made to the present disclosure by referring to the preceding embodiments, those skilled in the art should understand that the technical solutions recorded in the above embodiments may be modified or part of technical features thereof may be equivalently substituted. Such modifications or substitutions will not cause the essences of the corresponding technical solutions to depart from the spirits and scopes of the technical solutions of various embodiments of the present disclosure.

The invention claimed is:

1. A double-row rope winder for a curtain, comprising: a rope winder seat; at least two winding core mounting grooves juxtaposed on the rope winder seat; a winding core for winding or unwinding a winding rope disposed in the winding core mounting grooves respectively; a first rotary part and a second rotary part respectively disposed at both ends of the winding cores; a first supporting part and a second supporting part cooperating with the first rotary part and the second rotary part disposed respectively at both ends of the winding core mounting grooves; a first rope guide hole and a second rope guide hole symmetrically disposed at both ends inside the winding core mounting grooves; and a third rope guide hole and a fourth rope guide hole symmetrically disposed at both ends between the two adjacent winding core mounting grooves on the rope winder seat.

2. The double-row rope winder for a curtain of claim 1, wherein the rope winder seat is a symmetrical structure, which is symmetrical left and right along a length centerline of the rope winder seat and also symmetrical up and down along a width centerline of the rope winder seat.

3. The double-row rope winder for a curtain of claim 1, wherein two winding core mounting grooves are juxtaposed on the rope winder seat, and the two winding core mounting grooves are a first winding core mounting groove and a second winding core mounting groove respectively; two ends of the first winding core mounting groove and two ends of the second winding core mounting groove are respectively aligned and are in a same horizontal line.

4. The double-row rope winder for a curtain of claim 3, wherein the first winding core mounting groove is in communication with the second winding core mounting groove; the third rope guide hole is located between the first rope guide holes in the first winding core mounting groove and the second winding core mounting groove, and the fourth rope guide hole is located between the second rope guide holes in the first winding core mounting groove and the second winding core mounting groove.

5. The double-row rope winder for a curtain of claim 4, wherein the third rope guide hole is in the same horizontal line as the two adjacent first rope guide holes and located in a middle point between the two adjacent first rope guide holes; the fourth rope guide hole is in the same horizontal line as the two adjacent second rope guide holes and located in a middle point between the two adjacent second rope guide holes; an anti-wear guide sleeve is disposed in the first rope guide holes, the second rope guide holes, the third rope guide hole and the fourth rope guide hole respectively.

6. The double-row rope winder for a curtain of claim 1, wherein a shaft hole is disposed in the first rotary part and the second rotary part respectively; the first rotary part is a blade-turning wheel and a shaft column is disposed at an end of the blade-turning wheel away from the winding core; the shaft column is in rotary cooperation with the first supporting part through a bearing; the second rotary part is a rolling shaft which is in rotary cooperation with the second supporting part through a bearing.

7. The double-row rope winder for a curtain of claim 1, wherein a cover plate for covering the winding cores is disposed on the winding core mounting grooves; one end of the cover plate is fitted to the first supporting part and the other end of the cover plate is fitted to the second supporting part; a plurality of through holes arranged with equal distance along a length direction of the cover plate are disposed on the cover plate.

8. An electric curtain, wherein the curtain comprises a curtain body, a top beam, a drive device, a transmission assembly and a double-row rope winder for the curtain, the double-row rope winder comprising a rope winder seat; at least two winding core mounting grooves are juxtaposed on the rope winder seat; a winding core for winding or unwinding a winding rope disposed in the winding core mounting grooves respectively; a first rotary part and a second rotary part respectively disposed at both ends of the winding cores; a first supporting part and a second supporting part cooperating with the first rotary part and the second rotary part disposed respectively at both ends of the winding core mounting grooves; a first rope guide hole and a second rope guide hole symmetrically disposed at both ends inside the winding core mounting grooves; and a third rope guide hole and a fourth rope guide hole symmetrically disposed at both ends between the two adjacent winding core mounting grooves on the rope winder seat, wherein the drive device is mounted at an end of the top beam; the drive device drives the double-row rope winder through the transmission assembly to control the curtain body to open and close; the double-row rope winders are symmetrically disposed inside the top beam; an end cover is connected at an end of the top beam opposed to the drive device; the curtain body comprises a daytime-use curtain body and a nighttime-use curtain body; a lower end of the daytime-use curtain body is connected with a first track, and a lower end of the nighttime-use curtain body is connected with a second track.

9. The electric curtain of claim 8, wherein the daytime-use curtain body and the nighttime-use curtain body are disposed in parallel back and forth below the top beam; the drive device comprises a first output end and a second output end disposed abreast; the transmission assembly comprises a first transmission shaft and a second transmission shaft; the first output end of the drive device is connected with the first transmission shaft which penetrates through the winding cores inside the first winding core mounting grooves in two double-row rope winders; a first winding rope is wound on the winding cores inside the first winding core mounting grooves respectively; the first winding rope in one double-row rope winder runs through the first rope guide hole or the second rope guide hole in the first winding core mounting groove and the daytime-use curtain body to connect with the first track; the first winding rope in the other double-row rope winder runs through the second rope guide hole or the first rope guide hole in the first winding core mounting groove and the daytime-use curtain body to connect with the first track; the first transmission shaft rotates to simultaneously drive the rotation of the winding cores in the two first winding core mounting grooves to control the two first winding ropes to wind or unwind and control the daytime-use curtain body to close or open; the second output end of the drive device is connected with the second transmission shaft which penetrates through the winding cores inside the second winding core mounting grooves in two double-row rope winders; a second winding rope is wound on the winding cores inside the second winding core mounting grooves respectively; the second winding rope in one double-row rope winder runs through the first rope guide hole or the second rope guide hole in the second winding core mounting groove and the nighttime-use curtain body to connect with the second track; the second winding rope in the other double-row rope winder runs through the second rope guide hole or the first rope guide hole in the second winding core mounting groove and the nighttime-use curtain body to connect with the second track; the second transmission shaft rotates to simultaneously drive the rotation of the winding cores in the two second winding core mounting grooves to control the two second winding ropes to wind or unwind and control the nighttime-use curtain body to close or open.

10. The electric curtain of claim 8, wherein the daytime-use curtain body and the nighttime-use curtain body are disposed up and down below the top beam; the drive device comprises a first output end and a second output end disposed abreast; the transmission assembly comprises a first transmission shaft and a second transmission shaft; the first output end of the drive device is connected with the first transmission shaft which penetrates through the winding cores inside the first winding core mounting grooves in two double-row rope winders; a first winding rope is wound on the winding cores inside the first winding core mounting grooves respectively; the first winding rope in one double-row rope winder runs through the third rope guide hole or the fourth rope guide hole, the daytime-use curtain body, the first track, and the nighttime-use curtain body to connect with the second track; the first winding rope in the other double-row rope winder runs through the fourth rope guide hole or the third rope guide hole, the daytime-use curtain body, the first track, and the nighttime-use curtain body to connect with the second track; the first transmission shaft rotates to simultaneously drive the rotation of the winding cores in the two first winding core mounting grooves to control the two first winding ropes to wind or unwind and control the nighttime-use curtain body to close or open; the second output end of the drive device is connected with the second transmission shaft which penetrates through the winding cores inside the second winding core mounting grooves in two double-row rope winders; a second winding rope is wound on the winding cores inside the second winding core mounting grooves respectively; the second winding rope in one double-row rope winder runs through the fourth rope guide hole or the third rope guide hole and the daytime-use curtain body to connect with the first track; the second winding rope in the other double-row rope winder runs through the third rope guide hole or the fourth rope guide hole and the daytime-use curtain body to connect with the first track; the second transmission shaft rotates to simultaneously drive the rotation of the winding cores in the two second winding core mounting grooves to control the two second winding ropes to wind or unwind and control the daytime-use curtain body to close or open.

* * * * *